US008750144B1

(12) United States Patent
Zhou et al.

(10) Patent No.: US 8,750,144 B1
(45) Date of Patent: Jun. 10, 2014

(54) SYSTEM AND METHOD FOR REDUCING REQUIRED MEMORY UPDATES

(75) Inventors: Junlan Zhou, Sunnyvale, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 579 days.

(21) Appl. No.: 12/908,197

(22) Filed: Oct. 20, 2010

(51) Int. Cl.
*H04L 12/26* (2006.01)
*H04L 12/54* (2013.01)
*G06F 7/00* (2006.01)
*G06F 13/30* (2006.01)
*G06F 15/16* (2006.01)
*G06F 15/173* (2006.01)
*G06F 17/30* (2006.01)

(52) U.S. Cl.
USPC ...... 370/252; 370/395.32; 707/785; 709/224; 709/229; 709/242; 711/108; 711/133; 711/159; 711/221; 726/3; 726/27

(58) Field of Classification Search
USPC .............. 370/252, 395.32; 707/785; 709/224, 709/229, 242; 711/108, 133, 159, 221; 726/3, 27
See application file for complete search history.

(56) References Cited

U.S. PATENT DOCUMENTS

| | | | | |
|---|---|---|---|---|
| 6,658,002 B1 * | 12/2003 | Ross et al. | ..................... | 370/392 |
| 6,775,737 B1 * | 8/2004 | Warkhede et al. | ............ | 711/108 |
| 6,871,265 B1 * | 3/2005 | Oren et al. | .................... | 711/128 |
| 6,970,462 B1 * | 11/2005 | McRae | ......................... | 370/392 |
| 6,993,031 B2 * | 1/2006 | Murase | .................... | 370/395.32 |
| 7,154,888 B1 * | 12/2006 | Li et al. | ......................... | 370/389 |
| 7,290,083 B2 * | 10/2007 | Shoham et al. | ............... | 711/108 |
| 7,313,667 B1 * | 12/2007 | Pullela et al. | ................. | 711/202 |
| 7,366,830 B1 * | 4/2008 | Maheshwari | ................ | 711/108 |
| 7,451,267 B1 * | 11/2008 | Venkatachary et al. | ...... | 711/108 |
| 7,509,674 B2 * | 3/2009 | Sterne | ............................. | 726/13 |
| 7,525,958 B2 * | 4/2009 | Kumar et al. | ................. | 370/386 |
| 7,530,112 B2 * | 5/2009 | Smith | ............................. | 726/28 |
| 7,536,476 B1 * | 5/2009 | Alleyne | ........................ | 709/238 |
| 7,555,594 B2 * | 6/2009 | Venkatachary | ............... | 711/108 |
| 7,669,244 B2 * | 2/2010 | Smith | ............................. | 726/26 |
| 7,711,893 B1 * | 5/2010 | Venkatachary | ............... | 711/108 |
| 7,782,859 B2 * | 8/2010 | Zhang et al. | .................. | 370/392 |
| 7,788,445 B2 * | 8/2010 | Pani | .............................. | 711/108 |
| 7,814,268 B2 * | 10/2010 | Maheshwari | ................. | 711/108 |
| 7,861,291 B2 * | 12/2010 | Kramer et al. | .................. | 726/13 |
| 7,881,291 B2 * | 2/2011 | Grah | ............................. | 370/389 |
| 7,904,642 B1 * | 3/2011 | Gupta et al. | .................. | 711/108 |
| 7,904,643 B1 * | 3/2011 | Venkatachary | ............... | 711/108 |
| 7,933,282 B1 * | 4/2011 | Gupta et al. | .................. | 370/412 |
| 7,954,163 B2 * | 5/2011 | Smith | ............................. | 726/28 |
| 8,122,189 B1 * | 2/2012 | Maheshwari | ................. | 711/108 |
| 8,139,586 B2 * | 3/2012 | Zhang et al. | ............. | 370/395.31 |

(Continued)

*Primary Examiner* — Alpus H Hsu
(74) *Attorney, Agent, or Firm* — Lerner, David, Littenberg, Krumholz & Mentlik, LLP

(57) ABSTRACT

Aspects of the invention provide for updating TCAMs while minimizing TCAM entry updates to add/delete ACL rules. For example, one aspect provides a method for minimizing updates in a router forwarding table, such as a TCAM, including a plurality of rules indexed by priority. This method comprises providing a proposed rule to be added to the router forwarding table, identifying a range of candidate entries in the router forwarding table for the proposed rule, determining a minimum set of rules to relocate, and creating an empty entry in the range of candidate entries based upon the minimum set of rules to relocate. The method may further comprise reallocating the minimum set of rules by, for example, shifting the minimum set of rules in sequence based on priority, and adding the proposed rule to the empty entry in the range of candidate entries.

19 Claims, 5 Drawing Sheets

(56) References Cited

U.S. PATENT DOCUMENTS 8,205,040 B1 * 6/2012 Mahamuni et al. ............ 711/108
8,307,153 B2 * 11/2012 Kishore ........................ 711/108
2008/0192754 A1 * 8/2008 Ku et al. ................... 370/395.32
2009/0125470 A1 * 5/2009 Shah et al. ....................... 706/47
2011/0038375 A1 * 2/2011 Liu et al. ........................ 370/392
2011/0161580 A1 * 6/2011 Shah et al. ..................... 711/108

* cited by examiner

SYSTEM AND METHOD FOR REDUCING REQUIRED MEMORY UPDATES

BACKGROUND OF THE INVENTION

A Ternary Content Addressable Memory ("TCAM") is a type of computer memory used in certain high speed searching applications, such as routing information through a network. It is designed such that it receives a data word and searches its entire memory to see if that data word is stored anywhere in it. If the data word is found, the TCAM returns a list of one or more storage addresses where the word was found. The data word may consist of 1's 0's, and X's ("don't care" bits). For example, a TCAM might have a stored word of "10XX0" which will match any of the four search words "10000", "10010", "10100", or "10110".

TCAMs are often used in network routers, where each address has two parts: the network address, which can vary in size depending on the subnet configuration, and the host address, which occupies the remaining bits. Each subnet has a network mask that specifies which bits of the address are the network address and which bits are the host address. Routing is done by consulting a routing table maintained by the router which contains each known destination network address, the associated network mask, and the information needed to route packets to that destination. Using a TCAM for the routing table makes the lookup process very efficient. The addresses are stored using "don't care" for the host part of the address, so looking up the destination address in the TCAM immediately retrieves the correct routing entry.

TCAMs have been widely used in routers, switches, and network security appliances of high speed networks to implement packet classification rules, e.g., access control list ("ACL") call rules. They may be used for various applications, including packet filtering, forwarding, traffic load balancing and shaping. However, a main challenge in developing these applications using TCAM is the time complexity in TCAM updates, and consistency of rule matching during the rule updates. This is because the ternary entries (each storing an ACL rule) are arranged in priority order, and adding a new ACL rule may require many TCAM entry updates, if it is to be inserted in between two existing rules in adjacent TCAM entries. For example, if a new rule is to be inserted between two existing rules, typically one of the existing rules and all rules above or below it must be shifted one space. Further, consistency of rule matching must be maintained during these updates. That is, rule matching results for packets not matching the new rule should not be altered.

SUMMARY OF THE INVENTION

Aspects of the invention provide for updating TCAMs while minimizing TCAM entry updates to add/delete ACL rules. For example, one aspect provides a method for minimizing updates in a router forwarding table, such as a TCAM, including a plurality of rules indexed by priority. This method comprises providing a proposed rule to be added to the router forwarding table, identifying a range of candidate entries in the router forwarding table for the proposed rule, determining a minimum set of rules to relocate, and creating an empty entry in the range of candidate entries based upon the minimum set of rules to relocate. The method may further comprise reallocating the minimum set of rules by, for example, shifting the minimum set of rules in sequence based on priority, and adding the proposed rule to the empty entry in the range of candidate entries. The range of candidate entries may be determined by identifying an upper bound and/or a lower bound for the rule to be added. Determining the minimum set of rules to relocate may comprise identifying a number of moves associated with moving existing rules in the range of candidate entries, and comparing the identified number of moves to determine the existing rule for which a fewest number of movements is required. The identified number of moves may be calculated in either or both of an upwards or downwards direction.

Another aspect of the invention provides a router for performing efficient updates, comprising a storage area storing a forwarding table including a plurality of forwarding rules indexed by priority, an input adapted to receive a proposed rule to be added to the forwarding table, and a processor programmed to identify a range of candidate entries in the forwarding table for the proposed rule, determine a minimum set of rules to relocate, and create an empty entry in the range of candidate entries based upon the minimum set of rules. The processor may be further programmed to identify a number of moves associated with moving two or more existing rules in the range of candidate entries, and compare the identified number of moves to determine the existing rule for which a fewest number of movements is required. Identifying the number of moves associated with moving the two or more existing rules in the range of candidate entries may include calculating a number of required moves to relocate to a higher indexed position and calculating a number of required moves to relocate to a lower indexed position. Identifying the range of candidate entries in the table for the proposed rule may include determining an upper bound and a lower bound for the proposed rule.

Yet another aspect of the invention provides a computer-readable medium storing a computer-readable program for implementing a method of minimizing updates in a router forwarding table. This method comprises providing a proposed rule to be added to the router forwarding table, identifying a range of candidate entries in the router forwarding table for the proposed rule, determining a minimum set of rules to relocate, and creating an empty entry in the range of candidate entries based upon the minimum set of rules to relocate. The minimum set of rules may be reallocated by, for example, shifting each rule in sequence based on priority. The method may further comprise identifying a number of moves associated with moving two or more existing rules in the range of candidate entries, and comparing the identified number of moves to determine the existing rule for which a fewest number of movements is required.

DETAILED DESCRIPTION

Figure 1:
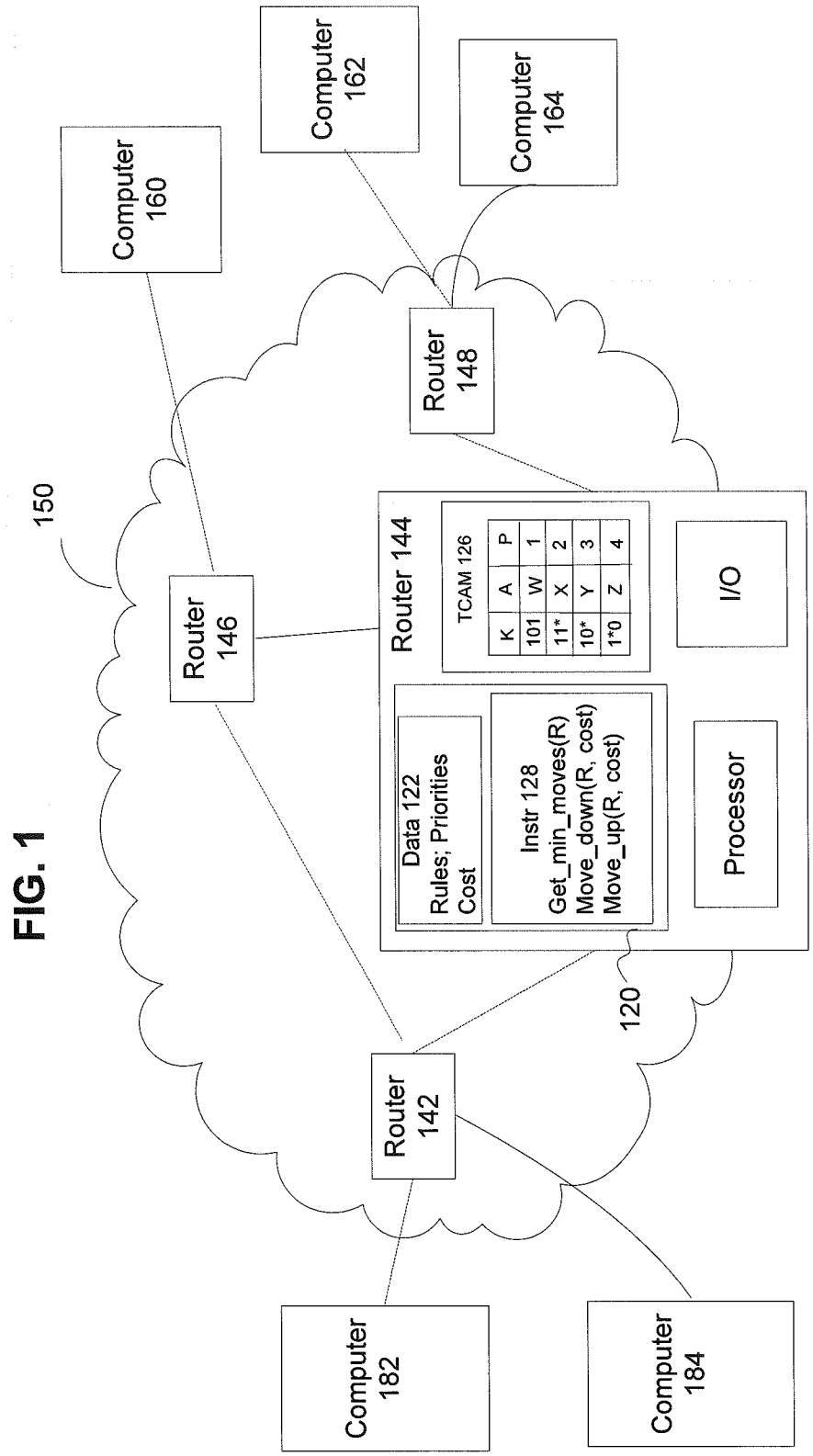
FIG. 1 is a system diagram according to an aspect of the invention.

FIG. 1 illustrates an example of a network 150 which joins a plurality of client computers 160, 162, 164, 182, 184. The network 150 includes a plurality of routers 142, 144, 146, 148. Each router 142-148 may include one or more input ports for receiving data from other routers or computing devices, such as packets or program updates. Similarly, each router 142-148 may have one or more output ports for transmitting data through the network 150. Each router 142-148 may also include one or more packet forwarding tables, such as TCAM 126 in the router 144. Further, each router may have a processor and a memory, such as the memory 120 of the router 144, which stores data 122 and instructions 128 for adding ACL rules to the TCAM 126. While TCAM 126 is shown as being stored separately from memory 120, it should be understood that the TCAM 126, data 122, and instructions 128 may all be stored in the same medium.

Memory 120 may be any of a variety of storage media, such as RAM, optical disc, magnetic storage, etc. While the memory 120 is shown as being integrated with the router 144, it should be understood that any type of hard drive or removable memory may be used. For example, the memory 120 may be a USB drive, or may be an independent storage medium coupled to one or more of the routers 142-148.

The computers 160, 162, 164, 182, 184 may be any of a variety of computing devices, including mobile devices, personal digital assistants (PDAs), laptops, PCs, etc. These device may be connected to the network via a wired connection, such as through a modem, or wirelessly, such as through an access point in communication with one of the routers 142-148.

As shown in FIG. 1, the TCAM 126 includes a number of entries, with each entry including an ACL rule. The rule includes a key (K), an action (A), and a priority (P). The key is an n-bit number, where each bit may be either a 1, 0, or wild card (e.g., "*"). An exact key does not have a wild card bit (e.g., 1101010). The key of a rule R, denoted as key(R), defines a set of packets the rule matches. The key(R) also comprises a set of tuples, each tuple corresponding to a packet header field (e.g., source IP, destination IP, source port, destination port, etc.), and having a value and mask to support wild-card matching.

Each rule is stored as a TCAM entry in order of priority. For example, the rule corresponding to key 101 and action W has a highest priority (1). Conversely, the rules corresponding to key 1*0 and action Z has a lowest priority, 4. Although only four TCAM entries are shown, it should be understood that any number of rules may be stored in the TCAM 126.

As packets flow from, for example, computer 182 to computer 162, information in the packets is used to determine how the packet should be routed. For example, router 142 may use packet information to determine that the next hop should be router 144, and router 144 receives the packet and determines that the next hop should be router 148. One mechanism used by the routers (e.g., router 144) to make such determination is the TCAM 126. For example, the TCAM 126 performs parallel matches of all stored rules against the header of an incoming packet.

In some circumstances, two or more rules overlap. For example, two rules overlap if a packet can match both of them. If multiple matches occur, the rule stored in the lowest indexed entry (the highest priority rule) is returned. Thus, for example, a packet with a header including key 1*1 matches both key 101 (action W, priority 1) and key 10* (action Y, priority 3). Because of its higher priority, the rule (K,A,P)={101,W,1} would be returned.

Figure 2:
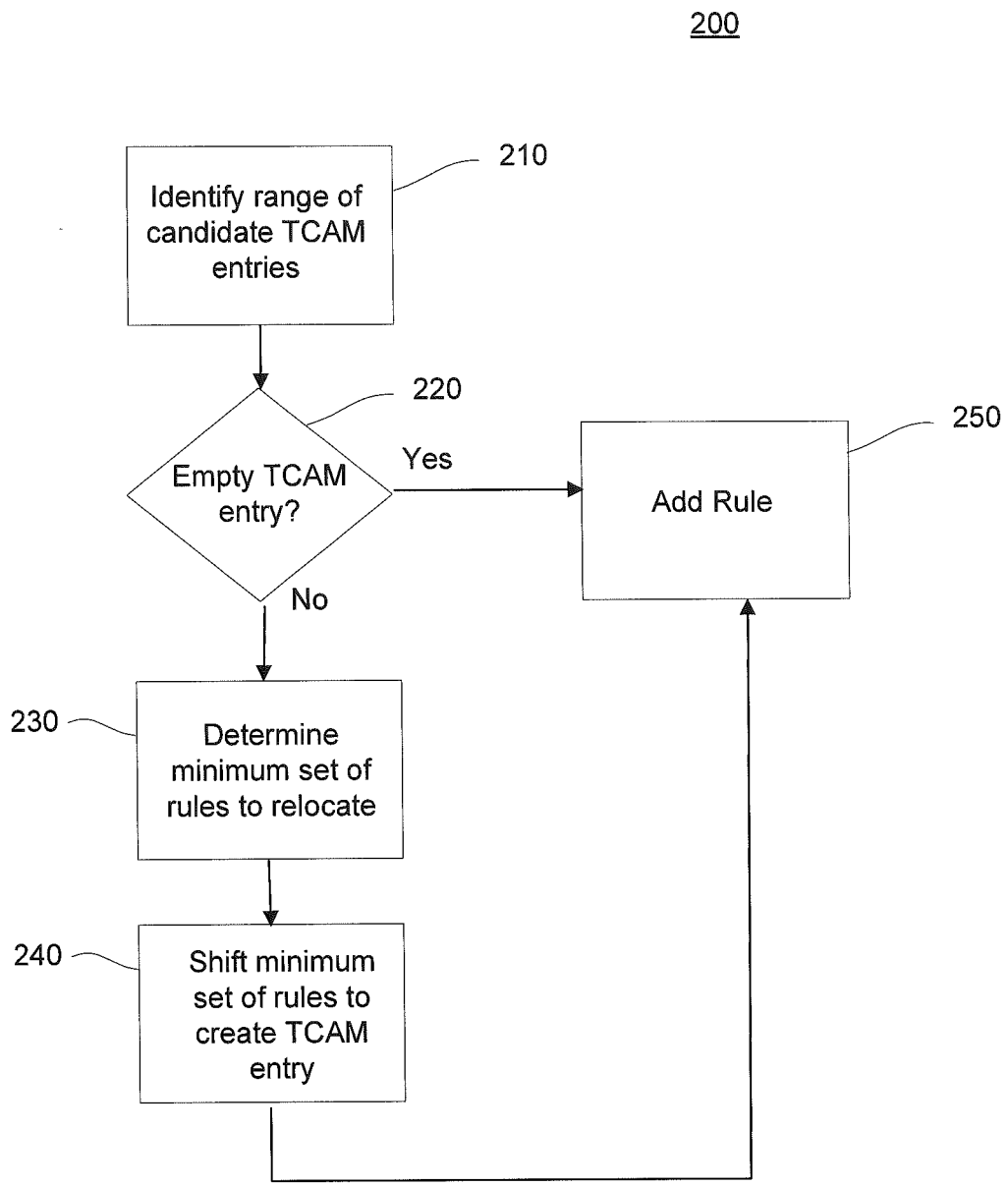
FIG. 2 illustrates a method according to an aspect of the invention.

From time to time, a TCAM may need to be updated. For example, a rule in an existing TCAM entry may need to be deleted. Alternatively or additionally, one or more rules may need to be added. To delete an ACL rule stored in a TCAM entry, only 1 entry update is required. That is, the entry may be removed without shifting the remaining entries to fill the empty slot. However, adding an ACL rule may be more complex. An exemplary method 200 of updating a TCAM to add an ACL rule is shown in FIG. 2.

In step 210, a block of candidate TCAM entries is identified. The new rule should be positioned in the TCAM with respect to priorities of existing entries, so that addition of the new rule R does not affect the forwarding behavior of the TCAM 126. For example, if the priority of the new rule to be added, priority(R), is 3, empty TCAM entries between rules of priority 2 or 3 and priority 3 or 4 would be appropriate for storing the new rule R. Otherwise, the packet forwarding behavior of the TCAM 126 may be changed. However, in some circumstances the priority of the rule R to be added may effectively be changed. For example, if the rule R doesn't overlap with any other rules in the TCAM 126, it may be stored in a lower priority entry because a packet matching rule R won't match any other rules.

In identifying the block of candidate TCAM entries for the new rule R, an upper bound and lower bound may be determined. The upper bound may be defined as a rule currently existing in the TCAM 126 which overlaps with the rule R and has higher priority. If multiple such rules exist, the upper bound is that rule with the lowest priority of the group. Similarly, the lower bound may be defined as a rule currently existing in the TCAM 126 which overlaps with the rule R and has lower priority. If multiple such rules exist, the lower bound is that rule with the highest priority of the group. Any TCAM entry indexed between the upper bound and lower bound may be used to store the new rule R. In some instances, the upper bound or lower bound may not exist. Thus, for example, if the upper bound does not exist, the new rule R may be stored in any slot of higher priority than the lower bound. If, conversely, the lower bound does not exist, the new rule R may be added to any slot of lower priority than the upper bound.

In step 220, it is determined whether an empty TCAM entry exists which could accommodate the new rule. For example, it may be determined whether any of the block of candidate entries between the identified upper bound and lower bound are empty. If it is determined that such an empty entry exists, the new rule may be added to it in step 250.

If it is determined in step 220 that there is no empty TCAM entry for the new rule, a minimum set of ACL rules that must be relocated is determined in step 230. For example, as opposed to shifting each rule on the TCAM 126 to create an entry for the new rule R, it may be determined that only a subset of rules can be shifted to create the empty slot. For example, to create an empty slot at index position 2, rule 4 may be moved to an empty index position (e.g., 6) and rule 2 may be moved to the position previously storing rule 4. An exemplary process for determining the minimum set of ACL rules to be relocated is described in detail with respect to FIGS. 3-5.

Once this minimum set of ACL rules is determined, these rules are relocated to empty a TCAM entry for the new rule, while preserving forwarding behaviors based on priorities of the rules and maintaining consistency in rule matching. One method of doing so is to relocate the lowest priority rule (i.e., the rule in the highest indexed position) first, and to sequentially move the remaining rules in the minimum set in order of highest indexed position to lowest. For example, if the minimum set of rules to relocate includes {R1, R3, R4} in index positions 1, 3, and 4, respectively, R4 may first be moved to an empty slot in a higher index position, R3 may then be moved to position 4, R1 may be moved to position 3, and the new rule may be added to position 1 (step 250).

Figure 4:
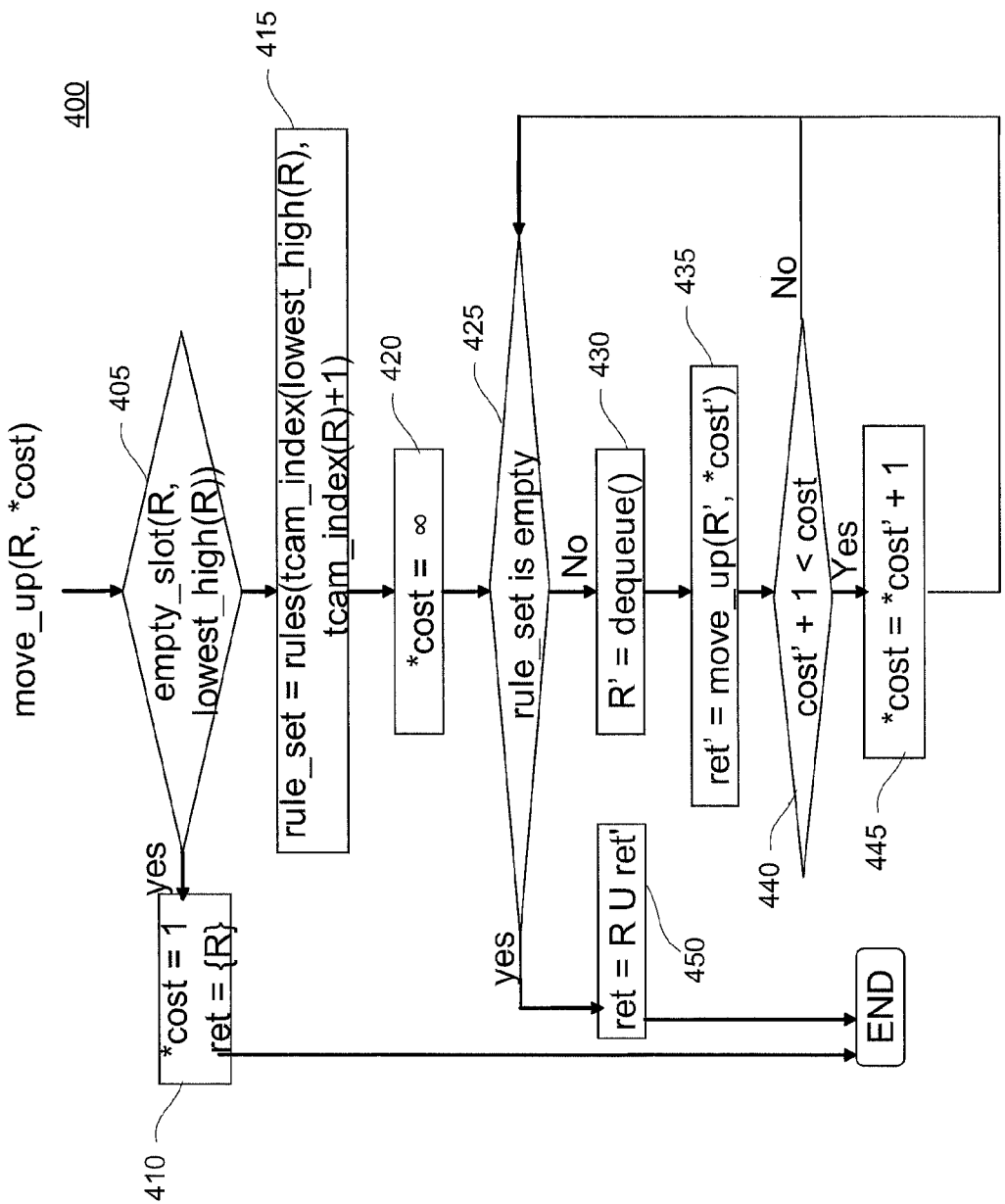
FIG. 4 illustrates a method according to a further aspect of the invention.
Figure 5:
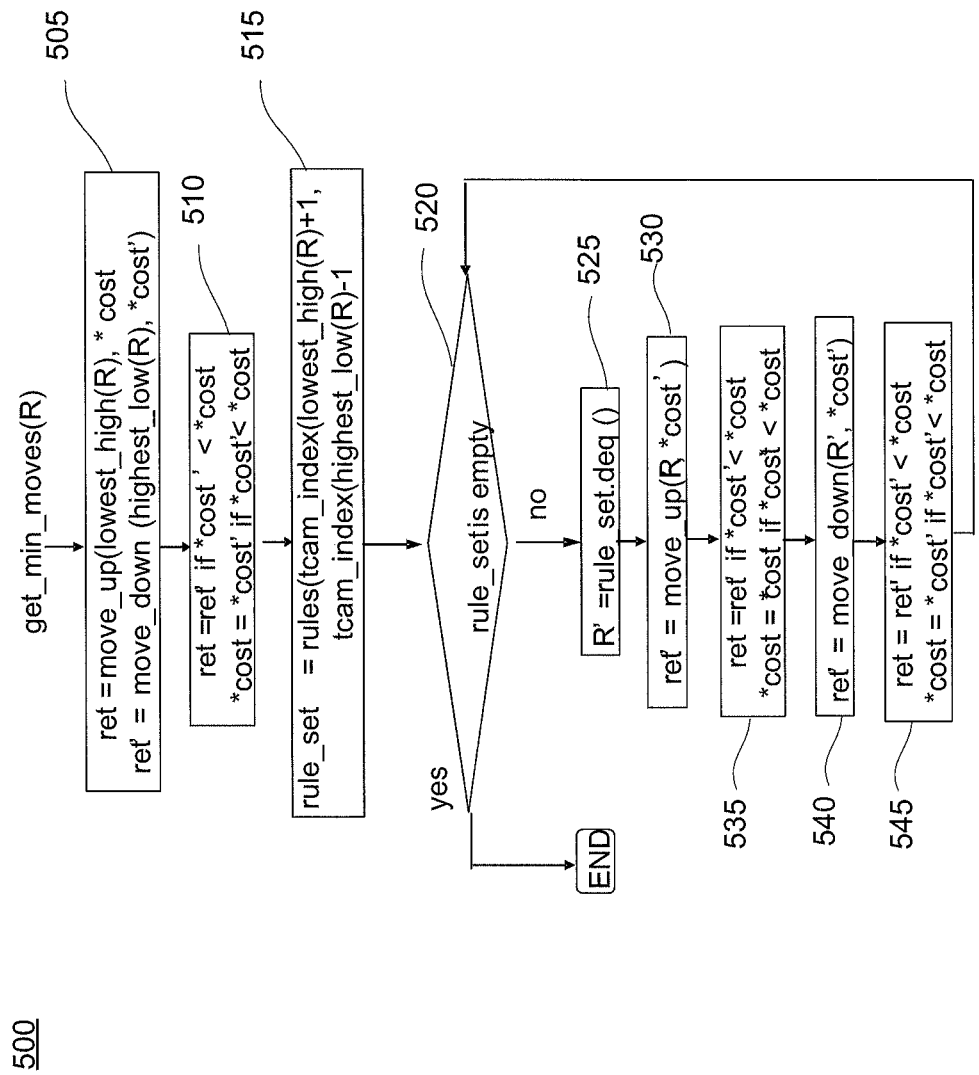
FIG. 5 illustrates a method according to yet another aspect of the invention.

As mentioned above, FIGS. 3-5 describe in detail a procedure for determining a minimum set of TCAM entries to relocate. Particularly, FIG. 3 describes a function move_down(R, *cost), which calculates a minimum number of rules that must be shifted downwards in the TCAM 126 to create an empty entry for new rule R. FIG. 4 describes a function move_up(R, *cost), which calculates a minimum number of rules that must be shifted upwards in the TCAM 126 to create an empty entry for new rule R. FIG. 5 utilizes the results from move_down(R, *cost) and move_up(R, *cost) to determine the minimum number of rules to be shifted to create an appropriate slot for new rule R.

Figure 3:
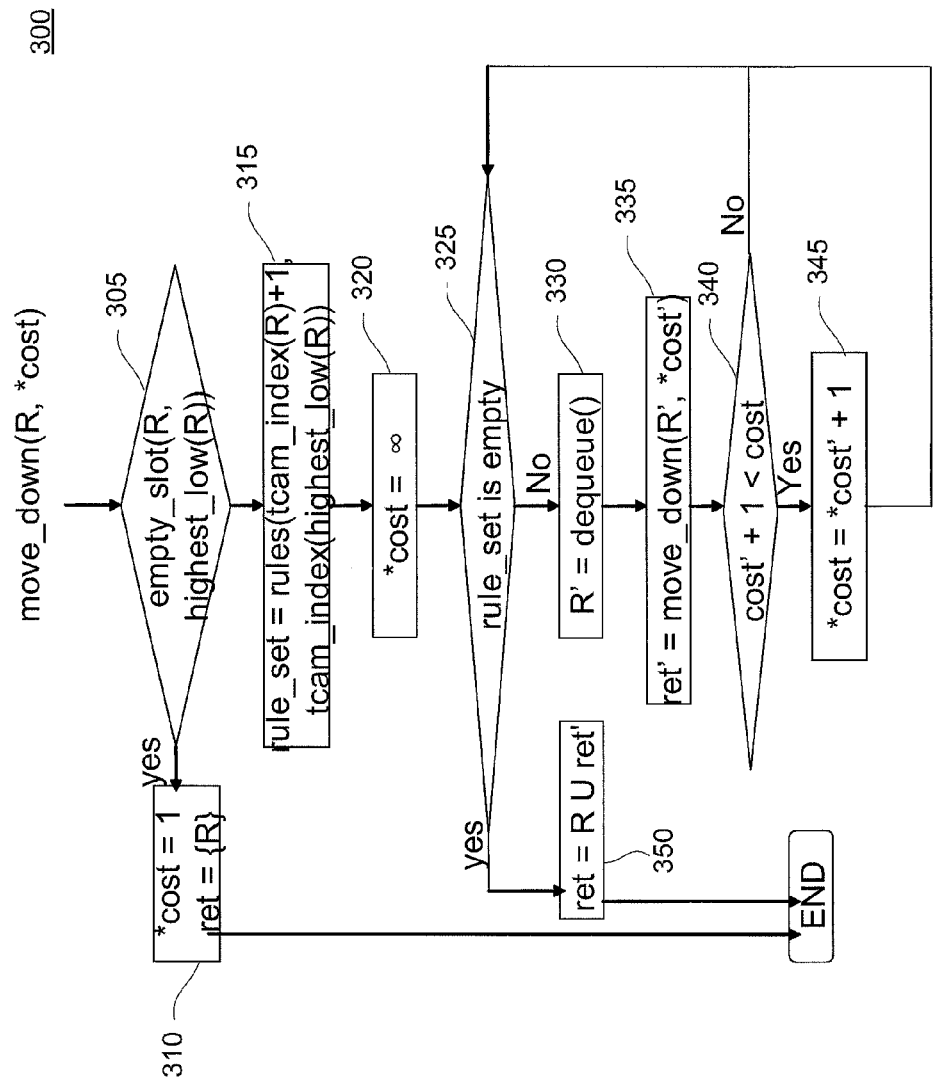
FIG. 3 illustrates a method according to another aspect of the invention.

A process 300 shown in FIG. 3 calculates the cost of shifting TCAM entries to a lower index. The cost is based upon a number of rules that must be shifted in order to add the new rule R.

In step 305 it is determined whether any empty slots exist within the lower bound for rule R. If such an empty slot exists, the process proceeds to step 310, which returns that rule R may be added to the empty slot. Thus, the cost of adding rule R is equal to 1, because no other rules were required to be shifted.

However, if it is determined in step 305 that no empty slots exist within the lower bound for rule R, the process proceeds to step 315. In this step, rule_set is set to all the rules existing in the TCAM entries between proposed new rule R and the lower bound of R.

In a worst case scenario, a cost of adding new rule R to the TCAM would be infinite. Accordingly, in step 320, the variable "*cost" is initially set to infinity.

In step 325, it is determined whether the set of rules between R and its lower bound is empty. If not, a rule R' is selected from the rule set in step 330 and removed from rule_set. Step 335 sets "ret'" to all rules needed to be moved down in order to move existing rule R' down to a lower indexed position.

Step 340 determines the "best" cost. That is, it is determined whether the cost of moving rule R' down is lower than *cost. Because in the first iteration *cost equals infinity, the cost (cost') for moving R' down will be lower. Thus, the process proceeds to step 345 where the cost of moving R down is calculated. This cost may simply be one plus the cost of moving down R', because placing R in the TCAM slot of R' is one additional move to the cost of moving R'.

Accordingly, *cost is set to the new lowest cost (i.e., the cost of moving R down into the slot for R') is saved for comparison to the remaining rules in rule_set in further iterations of steps 325-345. This process continues until all the rules in rule_set have been compared. Thus, the resulting *cost after all rules have been compared will be the lowest cost. Accordingly, in step 350 the rules that are needed to be moved in the determined "best" cost maneuver are returned.

Similar to the process 300, a process 400 shown in FIG. 4 calculates the cost of shifting TCAM entries to a higher index. The cost is based upon a number of rules that must be shifted in order to add the new rule R.

In step 405 it is determined whether any empty slots exist within the upper bound for rule R. If such empty slot exists, the process proceeds to step 410, which returns that rule R may be added to the empty slot. Thus, the cost of adding rule R is equal to 1, because no other rules were required to be shifted.

However, if it is determined in step 405 that no empty slots exist within the upper bound for rule R, the process proceeds to step 415. In this step, rule_set is set to all the rules existing in the TCAM entries between proposed new rule R and the upper bound of R.

In a worst case scenario, a cost of adding new rule R to the TCAM would be infinite. Accordingly, in step 420, the variable "*cost" is initially set to infinity.

In step 425, it is determined whether the set of rules between R and its upper bound is empty. If not, a rule R' is selected from the rule set in step 430 and removed from rule_set. Step 435 defines "ret'" as all rules needed to be moved up in order to move existing rule R' down to a higher indexed position.

Step 440 determines the "best" cost. In this case, it is determined whether the cost of moving rule R' up is lower than *cost. Because in the first iteration *cost equals infinity, the cost (cost') for moving R' up will be lower. Thus, the process proceeds to step 445 where the cost of moving R up is calculated. This cost may simply be one plus the cost of moving up R', because placing R in the TCAM slot of R' is one additional move to the cost of moving R'. Accordingly, *cost is set to the new lowest cost (i.e., the cost of moving R up into the slot for R') is saved for comparison to the remaining rules in rule_set in further iterations of steps 425-445. This process continues until all the rules in rule_set have been compared. Thus, the resulting *cost after all rules have been compared will be the lowest cost. Accordingly, in step 450 the rules that are needed to be moved in the determined "best" cost maneuver are returned.

FIG. 5 shows a process 500 incorporating the lowest cost of moving rules down to lower TCAM indexes and lowest cost of moving rules up to higher TCAM indexes derived in FIGS. 3 and 4, respectively. Accordingly, the process 500 returns the lowest cost for any moves within the TCAM 126 to create an empty entry for new rule R.

In step 505, "ret" is set to the fewest number of rules that would need to be moved in order to move the upper bound of R to a higher indexed entry in the TCAM.

Additionally, "ret'" is set to the fewest number of rules that would need to be moved in order to move the lower boundary to a lower indexed position. In step 510, these two scenarios ret and ret' are compared, and the lower cost move is saved.

In step 515, rule_set is set as all the rules existing in the TCAM entries between the upper bound and lower bound of R. In step 515, it is determined whether this rule_set is empty. If so, indicating that all rules within the upper and lower bounds have been analyzed, or that the upper and lower bounds are indexed adjacent one another, the process is ended. However, if rule_set is not empty, a rule R' is selected in step 525 and removed from the rule_set.

Step 530 returns the rules that would need to be moved in order to move R' selected from rule_set up. If the cost of this move is lower than the cost saved in step 510 (i.e., if fewer TCAM entries are required to be shifted to move R' than to move the upper or lower bound), the cost of moving R' up to a higher indexed position is stored in step 535 as the "best" cost. Otherwise, the cost of moving the upper or lower bound (whichever requires fewer moves) is retained as the cost.

Similarly, in step 540, the number of moves required to move R' down to a lower indexed position is returned. If the cost of this move is lower than the lowest previously saved cost, the cost of moving R' down to a lower indexed position is stored in step 545 as the best cost.

The process then returns to step 520, where selection and comparison of rules (steps 525-545) are repeated until all rules between and including the upper and lower bounds of R have been analyzed. Accordingly, the resulting *cost will be the lowest cost move in either direction.

The above methods may be performed any time a new rule is to be added. As mentioned with respect to FIG. 1, the above described methods may be implemented as software (e.g., executable code stored in memory 120) and executed by a processor in the router. Alternatively, the software may be stored remotely. This software application may be automatically run each time an ACL rule is to be added to the TCAM. However, the methods may, according to one aspect, be performed manually by a network manager.

A major benefit of the above-described methods is cost savings. Because updates are not required when deleting a rule, the cost of updating is reduced. Further, various TCAM entries may remain empty, which facilitates later addition of rules. Importantly, the above-described methods maintain consistency in rule matching during updates, because rules are relocated one at a time based on priority. In addition, forwarding behaviors are not affected during the update, so packets may continually be transmitted through the network 150 during update of the TCAM 126, thereby saving time.

Although the present invention has been described with reference to particular embodiments, it should be understood that these examples are merely illustrative of the principles and applications of the present invention. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. For example, the steps taken to derive the lowest cost number of moves within the TCAM may be modified. However, these and that other arrangements may be devised without departing from the spirit and scope of the present invention as defined by the appended claims.

The invention claimed is:

1. A method for minimizing updates in a ternary content addressable memory (TCAM) including a plurality of access control list (ACL) rules indexed by priority, the method comprising:
    providing a proposed rule to be added to the TCAM;
    determining whether an empty TCAM entry exists;
    adding the proposed rule to the empty TCAM entry if the empty TCAM entry exists;
    identifying, using a processor, a range of candidate entries in the TCAM for the proposed rule if no empty TCAM entry exists;
    determining, using the processor, a minimum set of rules to relocate within the plurality of ACL rules;
    creating an empty entry in the range of candidate entries based upon the minimum set of rules to relocate; and
    adding the proposed rule to the created empty entry.

2. The method of claim 1, further comprising shifting the minimum set of rules in sequence based on priority.

3. The method of claim 2, further comprising adding the proposed rule to the created empty entry in the range of candidate entries.

4. The method of claim 1, wherein determining the minimum set of rules to relocate comprises identifying a first number of moves associated with moving at least one existing rule in the range of candidate entries.

5. The method of claim 4, wherein determining the minimum set of rules to relocate comprises:
    identifying a second number of moves associated with moving two or more existing rules in the range of candidate entries; and
    comparing the first number of moves to the second number of moves to determine the existing rule for which a fewest number of movements is required.

6. The method of claim 5, wherein
    the second number of moves is associated with moving each rule in the range of candidate entries.

7. The method of claim 5, wherein identifying the second number of moves includes calculating a number of required moves to relocate to a higher indexed position and calculating a number of required moves to relocate to a lower indexed position.

8. The method of claim 1, wherein identifying the range of candidate entries in the TCAM for the proposed rule includes determining an upper bound, the upper bound being a lowest priority rule existing in the TCAM, overlapping with the proposed rule, and having a higher priority than the proposed rule.

9. The method of claim 1, wherein identifying the range of candidate entries in the TCAM for the proposed rule includes determining a lower bound, the lower bound being a highest priority rule existing in the TCAM, overlapping with the proposed rule, and having lower priority than the proposed rule.

10. The method of claim 1, further comprising deleting a rule from the TCAM to create the empty entry.

11. A router for performing efficient updates, comprising:
    a storage area storing a ternary content addressable memory (TCAM) including a plurality of access control list (ACL) rules indexed by priority;
    an input adapted to receive a proposed rule to be added to the TCAM; and
    a processor programmed to:
    identify whether an empty TCAM entry exists;
    add the proposed rule to the empty TCAM entry if the empty TCAM entry exists;
    identify a range of candidate entries in the TCAM for the proposed rule if no empty TCAM entry exists;
    determine a minimum set of rules within the plurality of ACL rules to relocate;
    create an empty entry in the range of candidate entries based upon the minimum set of rules; and
    add the proposed rule to the created empty entry.

12. The router of claim 11, wherein the processor is further programmed to:
    identify a first number of moves associated with moving a first number of existing rules in the range of candidate entries;
    identify a second number of moves associated with moving a second number of existing rules in the range of candidate entries; and
    compare the first number of moves to the second number of moves to determine the existing rule for which a fewest number of movements is required.

13. The router of claim 11, wherein,
    in determining a minimum set of rules to relocate, the processor is further programmed to calculate a number of required moves to relocate to a higher indexed position and calculate a number of required moves to relocate to a lower indexed position.

14. The router of claim 11, wherein the processor, in identifying the range of candidate entries in the TCAM for the proposed rule, is programmed to determine an upper bound, the upper bound being a lowest priority rule existing in the TCAM, overlapping with the proposed rule, and having higher priority than the proposed rule.

15. The router of claim 11, wherein the processor, in identifying the range of candidate entries in the TCAM for the proposed rule, is programmed to determine a lower bound, the lower bound being a highest priority rule existing in the TCAM, overlapping with the proposed rule, and having lower priority than the proposed rule.

16. The router of claim 11, wherein the TCAM is updated only when a proposed rule is to be added.

17. A non-transitory computer-readable medium storing a computer-readable program for implementing a method of minimizing updates in a ternary content addressable memory (TCAM), the method comprising:
   providing a proposed rule to be added to the TCAM;
   determining whether an empty TCAM entry exists;
   adding the proposed rule to the empty TCAM entry if the empty TCAM entry exists;
   identifying a range of candidate entries in the TCAM for the proposed rule if no empty TCAM entry exists;
   determining a minimum set of rules to relocate;
   creating an empty entry in the range of candidate entries based upon the minimum set of rules to relocate; and
   adding the proposed rule to the created empty entry.

18. The non-transitory computer-readable medium of claim 17, wherein the method further comprises:
   identifying a first number of moves associated with moving a first number of existing rules in the range of candidate entries;
   identifying a second number of moves associated with moving a second number of existing rules in the range of candidate entries; and
   comparing the first number of moves to the second number of moves to determine the existing rule for which a fewest number of movements is required.

19. The non-transitory computer-readable medium of claim 17, wherein the method further comprises shifting the minimum set of rules in sequence based on priority.

* * * * *